United States Patent [19]

Brown

[11] 4,046,436
[45] Sept. 6, 1977

[54] ARTICULATED THRUST BEARING

[75] Inventor: Villy Brown, Chicago, Ill.

[73] Assignee: Aetna Bearing Company, Chicago, Ill.

[21] Appl. No.: 709,327

[22] Filed: July 28, 1976

[51] Int. Cl.² .......................................... F16C 19/00
[52] U.S. Cl. .................................. 308/233; 192/45; 308/135
[58] Field of Search .................. 308/233, 135; 192/45, 192/98

[56] References Cited
U.S. PATENT DOCUMENTS

| 3,333,664 | 8/1967 | Chapaitis | 192/9 B |
| 3,390,927 | 7/1968 | Adams | 308/233 X |
| 3,909,086 | 9/1975 | Kekshian | 308/233 |

Primary Examiner—Philip Goodman
Assistant Examiner—Gene A. Church
Attorney, Agent, or Firm—Olson, Trexler, Wolters, Bushnell & Fosse, Ltd.

[57] ABSTRACT

An articulated thrust bearing is disclosed. Two oppositely disposed bearing races are permitted to rotate relative to one another in a relatively frictionless manner by bearing elements disposed therebetween. Against one of these races, a rocker ring pivots to provide an articulating motion to an associated clutch fork-engaging carrier plate. Several embodiments of the rocker ring-second race fulcrum are described.

15 Claims, 10 Drawing Figures

U.S. Patent  Sept. 6, 1977  Sheet 1 of 3  4,046,436
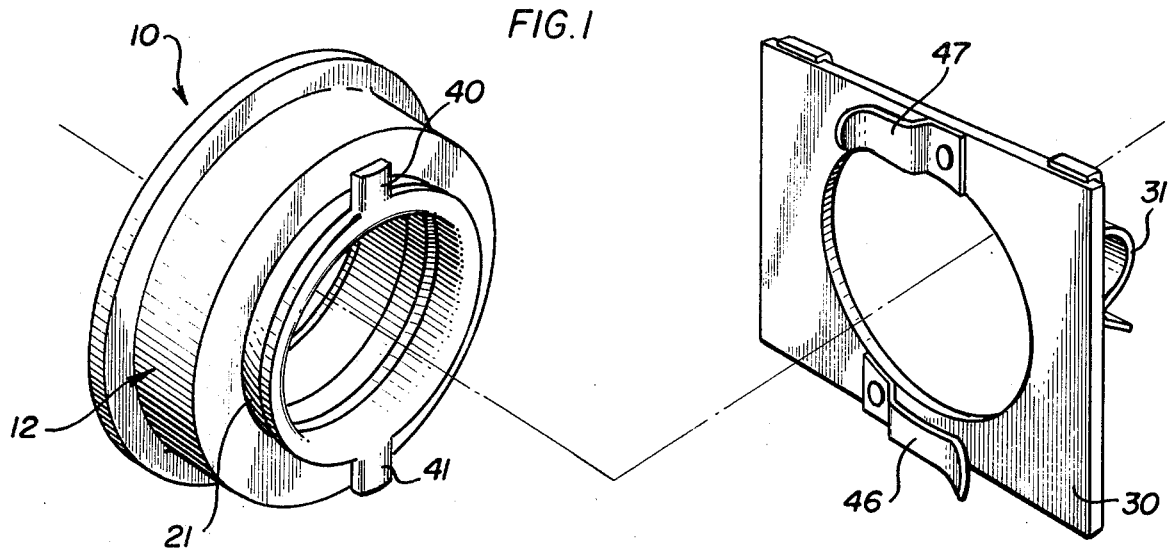
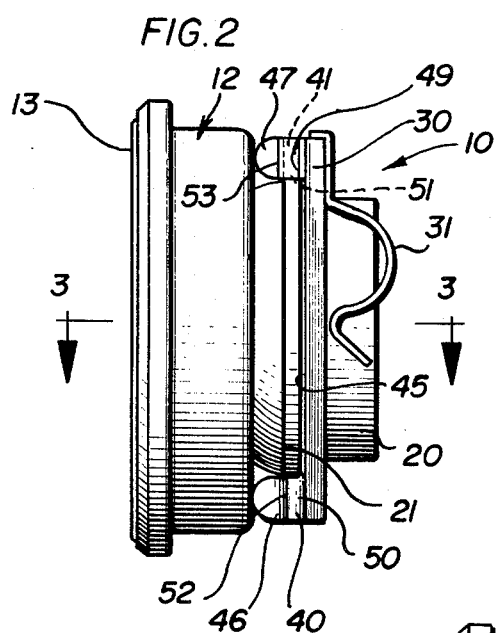
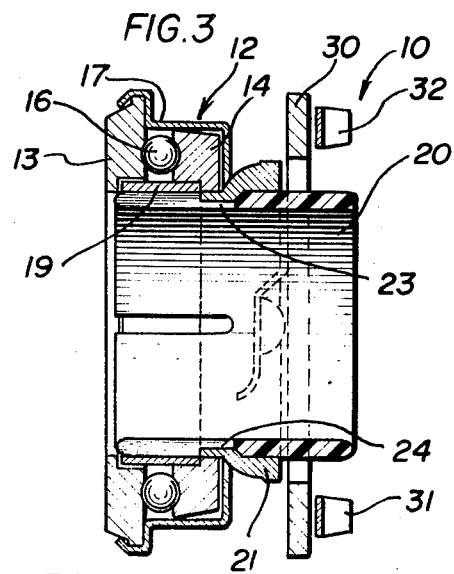
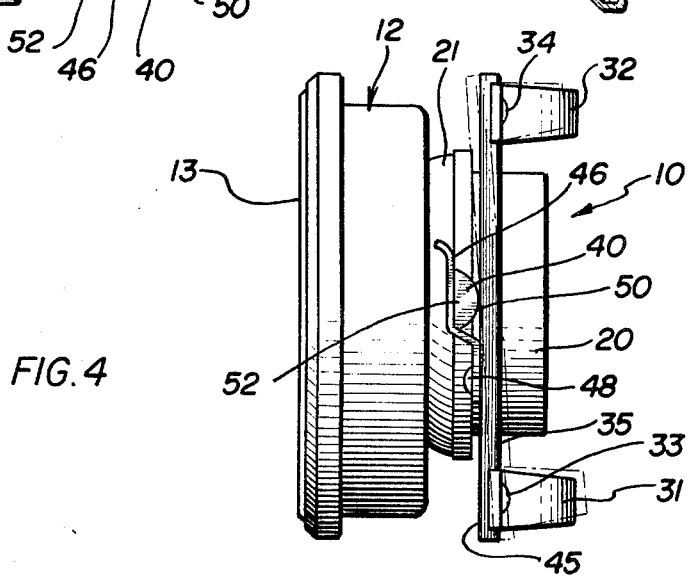

ARTICULATED THRUST BEARING

BACKGROUND OF THE INVENTION

This invention relates generally to thrust bearings, and more particularly concerns a thrust bearing which will accommodate slight misalignment of associated parts within an automotive clutch or like device.

Automotive clutch throw-out bearings are commonly used to provide a force-transmitting device or member between the foot-operated clutch pedal lever (or other clutch actuator) and other parts of the clutch. These clutch throw-out bearings are subjected to substantial forces and long periods of use under the rigors of adverse driving conditions. One such clutch throw-out bearing assembly is disclosed and claimed in U.S. Pat. No. 3,909,086 issued Sept. 30, 1975.

Production of automotive clutches and associated parts requires that the parts be assembled at minimum cost. Excessively precise part alignment requirements are, of course, expensive, and can result in a high rate of assembly rejection or assembly failure if the alignment requirements are not met.

In addition, clutch parts can become misaligned during the ordinarily heavy use of the clutch assembly. One such alignment problem of particular importance is the alignment of the clutch fork and associated fingers with the clutch thrust bearing.

It is accordingly the general object of the present invention to provide an articulating or flexible connection between the clutch fork and associated clutch fingers on one hand, and the clutch thrust bearing and a rotating shaft on the other hand.

Another object of the invention is to provide a clutch thrust bearing which will accommodate at least slight misalignment of the clutch fork fingers with the shaft and with the bearing itself during clutch use.

Yet another object is to provide a clutch thrust bearing which will provide long, trouble-free service life, and which can be manufactured at relatively modest cost.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a perspective view showing, in a modified exploded arrangement, the thrust bearing and an associated carrier plate of the present invention;

FIG. 2 is a side elevational view of the clutch thrust bearing and associated carrier plate shown in FIG. 1;

FIG. 3 is a sectional view taken substantially in the plane of line 3—3 in FIG. 2;

FIG. 4 is a top plan view of the clutch thrust bearing as shown in FIGS. 1 and 2;

DETAILED DESCRIPTION

Figure 5:
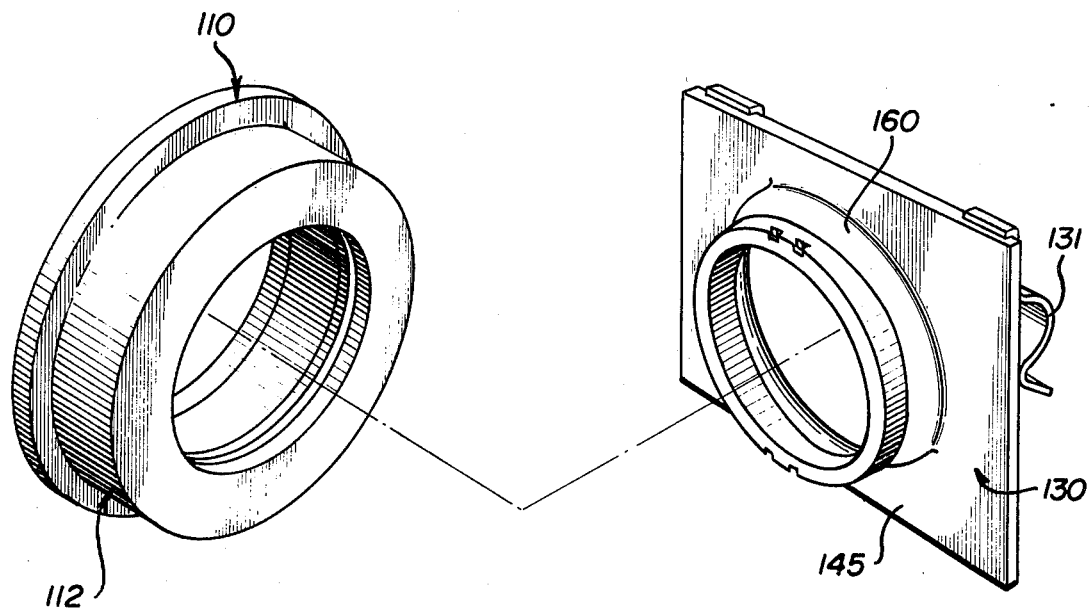
FIG. 5 is a perspective view similar to FIG. 1 but showing a modified embodiment of the invention.

While the invention will be described in connection with preferred embodiments, it will be understood that it is not intended to limit the invention to these embodiments. On the contrary, it is intended to cover all alternatives, modifications and equivalents as may be included within the spirit and scope of the invention as defined by the appended claims.

Turning first to FIGS. 1-4, there is shown a clutch thrust bearing assembly 10 embodying the present invention. In general, this thrust bearing assembly can be considered to comprise a bearing unit 12 which includes a pair of spaced apart, oppositely disposed thrust rings 13 and 14. Between these thrust rings 13 and 14, a plurality of bearing elements such as ball bearings 16 are disposed for frictionless bearing action. The thrust rings 13 and 14 are maintained in the assembled configuration shown in FIG. 3 as by a static angular connecting ring 17. A bearing lubricant retaining ring 19 is disposed radially inwardly of the ball bearing elements 16 to assist in retaining grease, oil, or other bearing lubricants between the thrust rings 13 and 14 and ball bearing elements 16.

A sleeve member 20 adapted to be splined upon or otherwise fit over a rotating shaft (not shown) is disposed radially inwardly of the above bearing elements. To provide longitudinal stability during thrust bearing operation, the axial extent of the sleeve 20 is on the order of about twice as long as the sleeve radius. A fulcrum collar 21, is mounted for rotation and other movement with the second of the thrust bearing elements 14, as shown in FIG. 3. This fulcrum collar 21 is here mounted on the sleeve 20 and partially within the bearing assembly 10, for the collar 21 is provided with a radially inwardly stepped shoulder portion 23 adapted to fit within an accommodating and mating groove 24 formed within the sleeve 20.

To accommodate and engage the clutch fork fingers (not shown) a carrier plate 30 is provided. Resilient retaining hooks or springs 31 and 32 are mounted, as by rivets 33 and 34 or other convenient means, upon an outer face 35 of the carrier plate 30. It will be understood that the clutch-actuating fork fingers (not shown) are accommodated between the carrier plate face 35 and the carrier plate hooks 31 and 32; force supplied by the clutch fork fingers in a direction oriented axially of the bearing 10 will move the bearing and the associated parts in that axial direction.

In accordance with the invention, this bearing assembly 10 can accommodate such fork fingers which are misaligned from one another in a direction extending axially of the bearing assembly 10 without jamming or suffering undue stress and strain. To this end, the collar 21 is provided with diametrically opposed collar stubs 40 and 41 which are rounded along one surface to provide a linear locus of contact between the stubs 40, 41 themselves and a planar reverse carrier plate face 45. Stub-engaging springs 46 and 47 are attached, as by rivets 48 and 49 or other convenient means, to the plate 30 and are sized and shaped so as to urge the carrier plate 30 towards these stubs 40 and 41.

In carrying out the invention, the carrier plate 30 is urged to a position oriented perpendicularly to the axis of the sleeve 20 and shaft (not shown). To this end, the ring stubs 40 and 41, while provided with rounded surfaces 50 and 51 for abutting the reverse carrier plate face 45, are provided also with flat surfaces 52 and 53 for engaging corresponding flat portions of the springs 46 and 47 respectively. Thus, as fork finger misalignment causes the carrier plate to be urged up out of its normal position shown in solid lines in FIG. 4 into a misaligned position shown in dotted lines, the carrier plate-stub shaft interconnector springs 46 and 47 are also urged out of there normal positions shown in solid lines in FIG. 4 to the misaligned positions shown in solid lines. In these positions, the springs 46 and 47 bias or urge the carrier plate 30 back into its normal, perpendicularly oriented operating position so as to encourage proper part alignments and minimize wear on assembly parts.

Assembly of the articulated bearing is made easy by orienting the springs 46 and 47 to extend in opposite directions. The stubs 40 and 41 can be simply pushed against the plate 30, and the unit twisted to bring the stubs into the spring-engaged position shown in FIGS. 2 and 4.

Figure 6:
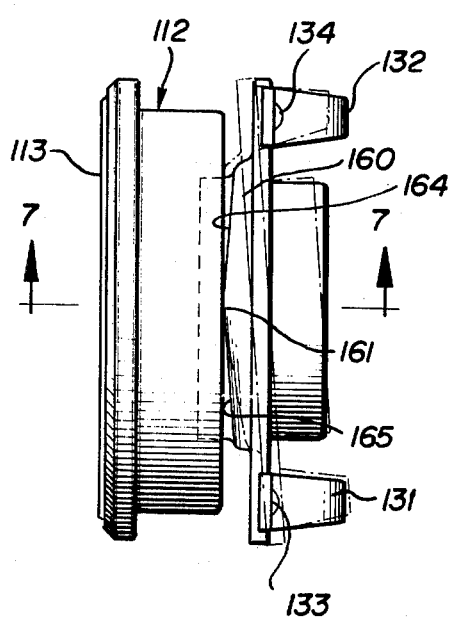
FIG. 6 is a top plan view of the modified embodiment of the invention similar in its aspects to FIG. 4.
Figure 7:
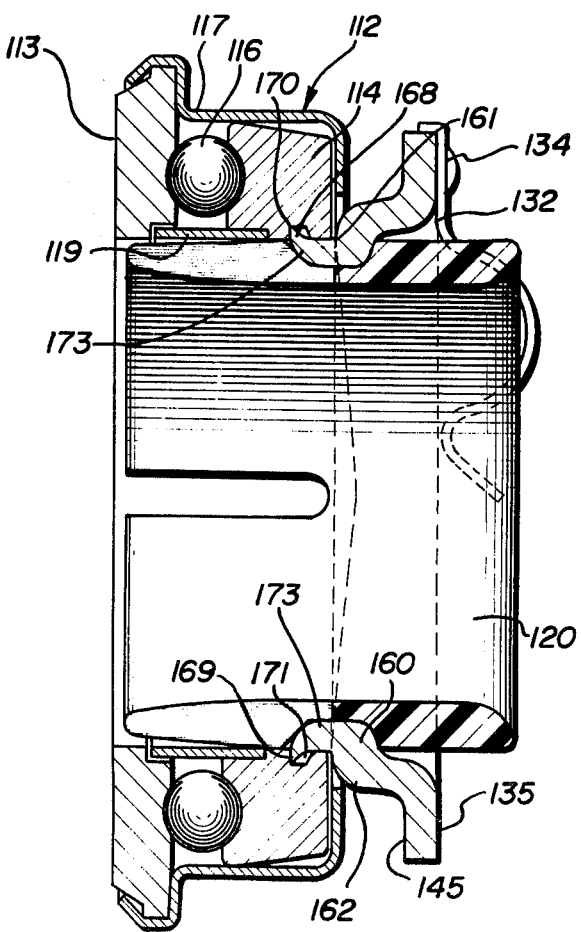
FIG. 7 is a sectional view taken substantially in the plane of line 7—7 in FIG. 6.

FIGS. 5, 6 and 7 illustrate a slightly modified embodiment of the invention, wherein parts corresponding to those described in the first embodiment carry the same reference numerals and the prefix 1. Here, the bearing unit 110 includes a bearing assembly 112 having thrust elements 113 and 114, between which ball bearing elements 116 ride. These elements are carried within a retaining ring 117.

In this embodiment, the carrier plate 130 is formed to include an integral, axially extending collar 160. At two rocker fulcrum points 161 and 162, the rocker ring is extended to its maximum axial length. At adjacent points around its circumference, the collar 160 is axially tapered or progressively shortened to form sloping surfaces 164 and 165. These surfaces 164 and 165 act as limit stops to prohibit excessive carrier plate pivoting movement and consequent damage to the clutch fork finger, carrier plate or other thrust bearing assembly elements. The collar 160 can be provided with radially outwardly extending tangs 168 and 169 adapted to engage recesses 170, 171 in the second thrust bearing element 114; this tang race interengagement secures the collar 160 and plate 130 to the bearing assembly 112. Moreover the tangs 168 and 169 engage a recess 173 formed in the ring 120 to mount the collar 160 to the sleeve 120 and provide a secure yet articulatable unit 110.

Figure 8:
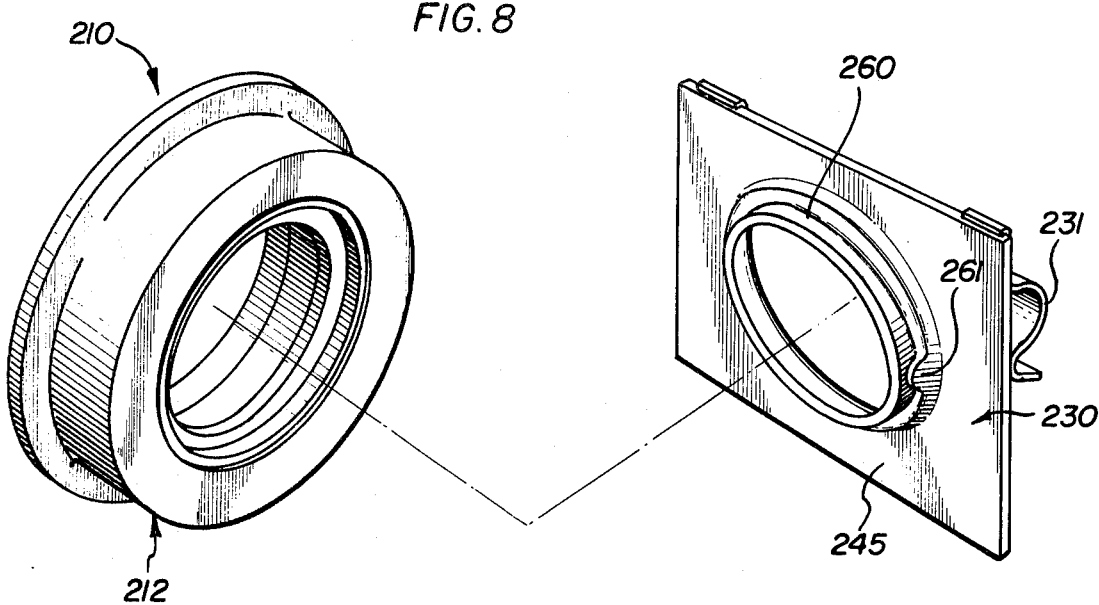
FIG. 8 is a perspective view similar to FIGS. 1 and 5 and showing yet another embodiment of the invention.
Figure 9:
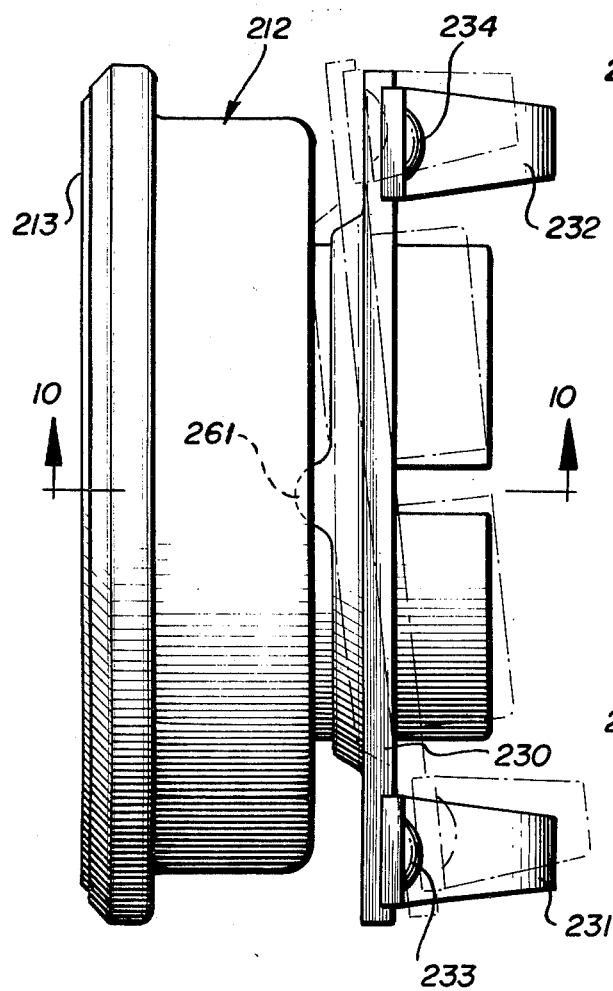
FIG. 9 is a top plan view of the second modification of the invention similar to FIGS. 4 and 6.
Figure 10:
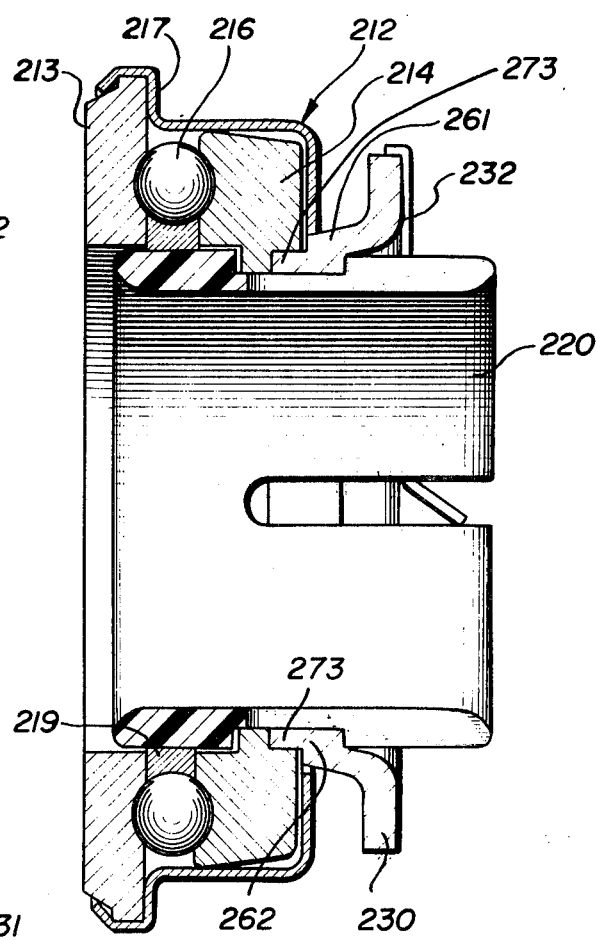
FIG. 10 is a sectional view taken substantially in the plane of line 10—10 in FIG. 9.

Yet another embodiment of the invention is shown in FIGS. 8–10, wherein parts similar to those shown in the first two embodiments carry the same reference numerals and the prefix 2. Here, the carrier plate 230 is provided with a modified, axially extending fulcrum collar 260. On this collar 260, fulcrum embossments 261 and 262 are formed, which bear against the second thrust bearing element 214 to provide a proper fulcrum for misalignment-accommodating articulating action.

Accordingly, there are disclosed several embodiments of the present invention, wherein the mounting means for a bearing assembly includes articulated elements maintained in an assembled relation. These embodiments, which are merely exemplary in nature of said invention, tend to reduce the need for precise alignment, or to phase it differently, increase the alignment tolerances, and prevent undue wear, noise, and other problems occasional due to misalignment. While several preferred embodiments are illustrated and described, it is envisioned and contemplated that those skilled in the art and in possession of the disclosure of the present invention may devise various changes, modifications or alterations over the structure illustrated, without in fact departing from the spirit and scope of the invention as defined by the claims appended hereto.

The invention is claimed as follows:

1. An articulated bearing assembly comprising at least two relatively rotatable races, and a mounting assembly for mounting the bearing on a shaft or the like, the mounting assembly including an axially elongated sleeve adapted for slidable connection with the shaft and fixed relative to one race, a carrier plate adapted for engagement by a clutch fork or the like for moving the bearing axially upon the shaft, articulating fulcrum means for permitting the carrier plate to rock relative to the sleeve about an axis perpendicular to the shaft, and retainer means for retaining the carrier plate on the sleeve in contact with the fulcrum means.

2. A bearing assembly according to claim 1 wherein said articulating fulcrum means comprises a pair of pivot devices located at diametrically opposed sides of the sleeve, said pivot axis extending between said pivot devices.

3. A bearing assembly according to claim 2 wherein said fulcrum means comprises a rocker ring having two fulcrum tangs extending radially therefrom.

4. A bearing assembly according to claim 2 wherein said pivot devices comprise a fulcrum collar axially tapered along opposite sides.

5. A bearing assembly according to claim 2 wherein said fulcrum collar is provided with at least two surfaces extending, at an angle other than perpendicularly to the race and shaft axis, away from one another and away from a race-rocker arm fulcrum contact point.

6. A bearing assembly according to claim 4 wherein said fulcrum collar is formed on said carrier plate.

7. A bearing assembly according to claim 2 including biasing means for urging said pivot devices into engagement with said carrier plate.

8. A bearing assembly according to claim 7 wherein said biasing means includes leaf springs secured to said carrier plate and extending in opposite directions.

9. A bearing assembly according to claim 2 wherein said pair of pivots are affixed to and extend from opposed sides of said carrier plate.

10. A bearing assembly according to claim 2 wherein said pair of pivots are formed on said carrier plate.

11. In a bearing assembly comprising at least two relatively rotatable races and a mounting assembly for mounting the bearing on a shaft or the like, the mounting assembly including an axially elongated sleeve adapted for slidable connection with the shaft and affixed relative to one race, a carrier plate adapted for engagement by a clutch fork or the like for moving the bearing axially upon the shaft, the improvement comprising carrier plate mounting means for mounting the carrier plate to the sleeve, the carrier plate mounting means including fulcrum means for permitting the carrier plate to rock relative to the sleeve about an axis perpendicular to the shaft.

12. In a bearing assembly according to claim 11, the further improvement comprising retainer means for retaining said carrier plate on said sleeve in contact with one of said races.

13. An articulated bearing assembly comprising at least two relatively rotatable races, and a mounting assembly for mounting the bearing on a shaft or the like, the mounting assembly including an axially elongated sleeve adapted for slidable connection with the shaft and fixed relative to one race, a carrier plate adapted for engagement by a clutch fork or the like for moving the bearing axially upon the shaft, articulating fulcrum means for permitting the carrier plate to rock relative to the sleeve about an axis perpendicular to the shaft, and retainer means for retaining the articulating fulcrum means on the sleeve.

14. An articulated bearing assembly according to claim 13 wherein said articulating fulcrum means retainer means includes radially outwardly extending tangs adapted to engage recesses in one of said races.

15. An articulated bearing assembly according to claim 14 wherein said articulating fulcrum means retainer means extends into a recess formed in said sleeve to mount the articulating fulcrum means on the sleeve.

* * * * *